COMPOSITE KEYBOARD

Filed July 13, 1949

INVENTOR
R. B. JOHNSON
BY J W Armbruster
ATTORNEY

Patented June 9, 1953

2,641,320

UNITED STATES PATENT OFFICE 2,641,320

COMPOSITE KEYBOARD

Reynold B. Johnson, Binghamton, N. Y., assignor to International Business Machines Corporation, New York, N. Y., a corporation of New York Application July 13, 1949, Serial No. 104,462

1 Claim. (Cl. 164—113)

This invention relates generally to improvements in keyboard arrangements, and more particularly the adaptation of a typewriter keyboard for multiple purpose use in controlling both letter and numeral printing or perforating.

It was discovered that the angular relationship between rows and columns of punch control keys on the standard manual keypunch machine used in the Hollerith perforated card system found a counterpart in a group of keys as they appear on the standard typewriter keyboard. The numeral keys of a keypunch keyboard are twelve in number and arranged with four keys in a column, there being three such columns stepped down successively towards the right as they appear to the operator. In other words, the top row of keys is not arrayed in a true horizontal line across the top of the keypunch keyboard; instead the line of keys slants upward towards the left, so also the other three rows in a left to right arrangement of digit keys, slant upward towards the left. The angle made between the vertical and horizontal sets of keys is approximately 70°.

Turning now to the consideration of the appearance of the keys on an ordinary typewriter, it is seen that they are truly horizontal in the rows extending from left to right. However, the vertical arrangement of keys is not truly in a vertical line but does have an angle with respect thereto very close to 70° which is the angle mentioned in connection with the keypunch keyboard. Therefore, it is this discovery and utilization of similarity of key placement which brings about a desired result whereby the touch system acquired by a keypunch operator may be utilized when a section of ordinary typewriter keys are set aside for shift operation to give them the dual purpose of controlling digital keypunching as well as alphabetic print or punch selection. In other words, a group of twelve keys on an ordinary typewriter keyboard are maintained in the usual position and utilized for the usual typewriter character selection operation and then the same group of keys is set aside for shift operation to be utilized with touch control for the control of duodecimal or digital punch selection by a trained keypunch operator. The operator is required merely to shift the angle of operation because, although the angular relationship between the rows and columns of twelve keys is substantially the same on the typewriter, they appear at an angle with respect to the horizontal plane, while on the keypunch machine they appear at an angle with respect to a vertical plane as seen from above.

An object of the invention is to provide keyboard arrangements having a dual purpose for joint touch control operation by those skilled in operating ordinary typewriter keys and ordinary keypunch keys.

Another object of the invention is to set aside a certain group of keys arranged in a standard way on a standard typewriter keyboard and make them available for keypunch control in an arrangement with which an operator is familiar.

Another object of the invention is to vary slightly the arrangement of keys on a typewriter keyboard in order to bring the arrangement of a certain group of keys thereon into a closer resemblance with arrangement of control keys on a keypunch. In an ordinary typewriter keyboard, the vertical array of four keys in a column is not in a straight line but has two jogs in going from top to bottom. For example, although the 5, Y, H and N keys of a typewriter are in substantial alignment, there is a slight degree of divergence in that the Y key is slightly to the right of the center line and the H key is slightly to the left of the center line drawn through the center of the 5 and N keys. Since the keys on a standard keypunch keyboard are arranged in true alignment in columns of four and rows of three, there is a slight deviation from this arrangement when the standard typewriter keyboard is used. Therefore, as an alternative, it is at times desirable to depart from the standard typewriter arrangement and align all vertical and horizontal arrangements of keys and therefore bring the character key arrangement into strict conformity with the group of twelve keys utilized for keypunch control.

Another object of the invention is the provision of a typewriter keyboard with a shift control whereby a certain group of keys thereon is made available for standard digital keypunch control as an alternative to ordinary character selection for typing or alphabet punching control.

Other objects of the invention will be pointed out in the following description and claims and illustrated in the accompanying drawings, which disclose, by way of example, the principle of the invention and the best mode, which has been contemplated of applying that principle.

Figure 1:
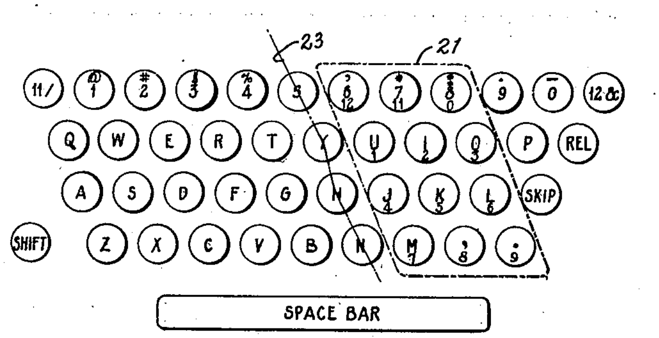
Fig. 1 is a view showing a substantially standard tyewriter keyboard as modified here with regard to a section 21 thereon set aside for a keypunch duodecimal control as well as ordinary character selection.
Figure 2:
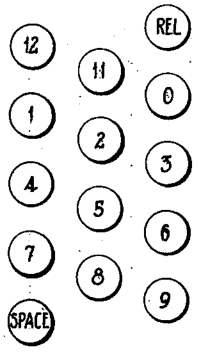
Fig. 2 shows the standard arrangement of the twelve duodecimal and digital control keys of an ordinary keypunch machine as well as the two extra control keys for spacing and releasing a card (see Fig. 1A of Patent 1,976,618, issued October 9, 1934, to F. Lee et al.).

In Fig. 1 is shown a standard typewriter key arrangement. There it is seen, as brought out by the broken line 23, that ordinarily the vertical columns of the typewriter keys are not in true alignment. There is a slight deviation, for example, in going from the 5 to Y to H and to the N keys. However, this deviation is not large enough to alter the mode of touch operation of a skilled keypunch operator accustomed to the keys shown in Fig. 2 when such key controls are assumed to be made coincident with the character keys within the block identified by the border 21 in Fig. 1. There is it seen that the ordinary column of keys representing 6, U, J and M on the typewriter keyboard is also identified as controlling over 12, 1, 4 and 7. Turning to Fig. 2, it is seen that the left column of control keys are also identified as controlling over selection of punching for the numbers 12, 1, 4 and 7. Glancing across the top of the keys in Fig. 2, it is seen that the three top numeral keys are identified as the 12, 11 and 0 keys. These are also found extending across the top of the group of typewriter keys within the frame 21. There they take the place of, or have additional control over the ordinary typewriter 6, 7 and 8 keys. In the same fashion, the second, third and fourth rows of digit keys are found to be related successively with the typewriter character keys.

In Fig. 1, it will be noted that the arrangement of twelve keys within frame 21 is substantially similar to the arrangement and angular relationships between the numeral keys shown in Fig. 2, the only difference being that the operator must swing to the left and shift in position in order to have the fingers work up and down at the angle found in the ordinary typewriter rather than at the truly vertical line found in the keypunch.

In Fig. 1, it is assumed that the shift key shown at the left operates contacts to control selection for duodecimal or digital keypunching as an alternative to ordinary character printing or punching by the ordinary typewriter key arrangement.

Figure 3:
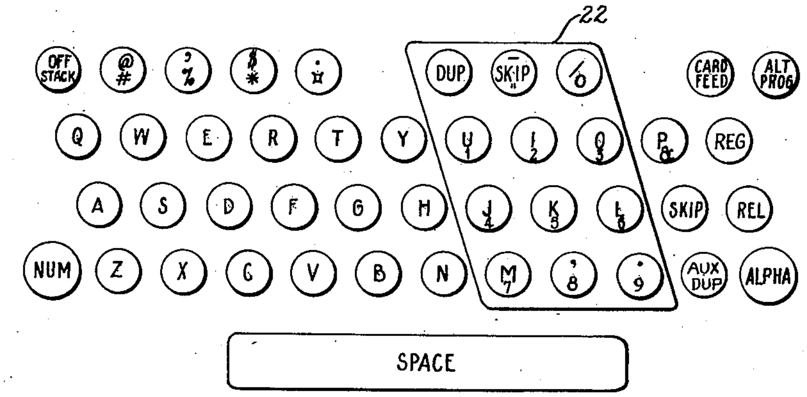
Fig. 3 is a plan view of a typewriter keyboard arranged to conform with the true alignment of the 9 digital keys found in an ordinary keypunch machine. The bordered section 22 is set aside for a keypunch control while these and the other alphabet character keys are in a standard arrangement and available for standard typewriter touch system control for operation of printing and punching.

Fig. 3 shows an alternative arrangement wherein the typewriter key arrangement is varied slightly with regard to vertical column alignment in order to conform more closely with the key arrangement found in keypunch machines. There it is seen that, within the frame 22, the twelve keys are truly aligned in both directions and have an angular arrangement more truly coincident with that of Fig. 2. The nine digital keys within frame 22 are also for dual control and have a selective effect for either character or numeral selection, such characters being of the standard arrangement to which all typewriter touch operators are accustomed. At the left in the bottom row of the key arrangement shown in Fig. 3, is the numeral shift key identified as NUM and this key is used to shift contacts for changing and locking circuit connections for keypunch rather than typewriter key operation.

Figure 4:
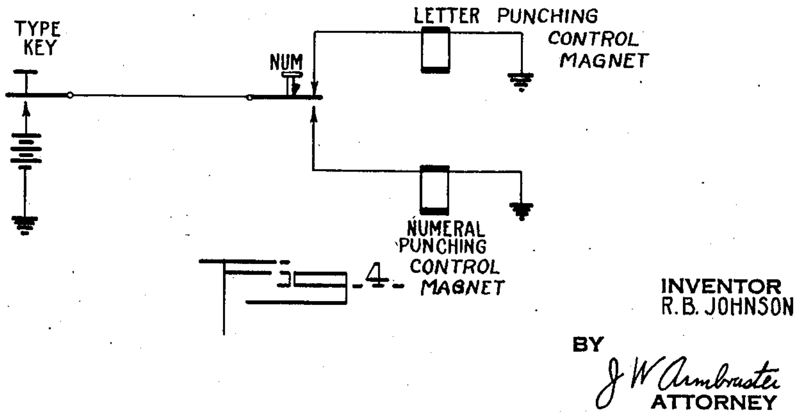
Fig. 4 is a diagrammatic showing of an electrical shift control wherein the numeral shift key changes the effect of typewriter key operation to change from letter selection to numeral and digital punch control.

In Fig. 4 is shown a wiring arrangement for control of letter and numeral magnets or solenoids which can control the printing or punching devices of existing machines in a well-known manner. The key NUM is the numeral shift key which is formed with a "lock down" extension and is held down until released. Key NUM operates a series of contact blades, such as the contact blade shown, to shift control from a normally closed letter selection contact to a normally open numeral selection contact. The "Type Key" of Fig. 4 relates to any of the dual purpose keys within the block 21 of Fig. 1 or the block 22 of Fig. 3. As an example of such a key, the J key of Fig. 3 is normally effective to cause perforation in code or printing under control of the letter magnet for the letter J. However, if the same key is depressed after the NUM shift key is set, it is selective of numeral punch selection for the digit 4 just as controlled by the 4 key of Fig. 2 and its effect over key punching as in the punch of Patent 1,976,618. The letter and numeral magnets can be in the same machine or in separate printing and punching machines.

For cross referencing purposes it may be noted that the mechanism and controls with which the present keyboard arrangements were designed to operate are set forth in the copending application of E. W. Gardinor et al., for a Record Card Punching Machine, Serial No. 103,224, filed on July 6, 1949.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claim.

What is claimed is:

Typewriter key controls wherein the character selecting keys have the same relative location and general aspect as the keys of a standard typewriter keyboard, but upon which the vertical columns of keys are aligned in straight but slanted lines, the angle which said slanted vertical columns of keys makes with the horizontal rows of keys being 70° and equal to that angular relationship between the columns and rows of digit keys on a standard tabulating card key punch keyboard, a group of twelve of said typewriter character keys being further designated as representative of duodecimal numbers and arranged as shown here under the most effective position of the right hand of the operator,

```
12
    11
1        0
    2
4        3
    5
7        6
    8
         9
```

said twelve keys being provided for dual use for key punch control by the standard key punch touch system as well as by operation in the typewriter touch system, a visually differentiated frame behind said twelve keys to emphasize their dual purpose, a shift key, electrical alphabet recording and numeral key punch control devices operated by said character keys, and electrical means under control of said shift key for selectively connecting said character keys to said key punch number recording control devices for control over electrical key punch operation alternatively with control over alphabetic recording control, whereby a tabulator card punch may be operated in accordance with key punch touch control on typewriter keys.

REYNOLD B. JOHNSON.

References Cited in the file of this patent

UNITED STATES PATENTS

| Number | Name | Date |
| --- | --- | --- |
| 2,030,405 | Schaaff | Feb. 11, 1936 |
| 2,064,340 | Davis | Dec. 15, 1936 |
| 2,318,299 | Doty | May 4, 1943 |